Nov. 10, 1964 H. V. ALEXANDERSSON ETAL 3,156,783

DISTRIBUTION FRAME

Filed March 28, 1961

INVENTORS
HARALD VALDEMAR ALEXANDERSSON
SVEN ERIC EVALD JOHANNESSON
JORMA PETTERI SAVIHARJU

BY Hane and Nydick
ATTORNEYS

United States Patent Office 3,156,783
Patented Nov. 10, 1964

3,156,783
DISTRIBUTION FRAME

Harald Valdemar Alexandersson, Lidingo, Sven Eric Evald Johannesson, Hagersten, and Jorma Petteri Savibarju, Kallhall, Sweden, assignors to Telefonaktiebolaget L M Ericsson, Stockholm, Sweden, a corporation of Sweden Filed Mar. 28, 1961, Ser. No. 98,869
Claims priority, application Sweden Apr. 11, 1960
5 Claims. (Cl. 179—98)

Figure 1:
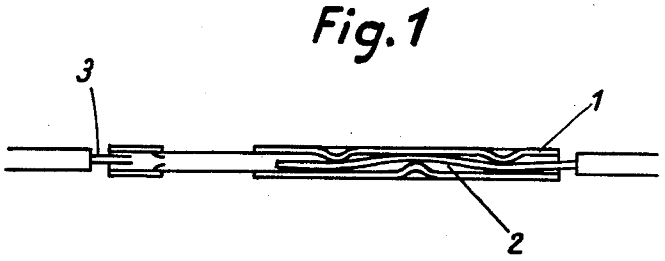

The present invention concerns a distribution frame for telephone exchanges, i.e. an interconnection frame, in which connections may be made between anyone of the lines incoming to the frame and anyone of the lines outgoing from the frame. The invention is specially useful for such a main distribution frame that is used for outgoing lines from a telephone exchange where fuses are not required.

The known distribution frames are voluminous and generally cause much labour for making connections and tests, specially if, as is required at modern telephone exchanges, the facility has to be provided of connecting, when desired, the subscriber's lines to an interception board, i.e. to an operator that informs about changed number a.s.o., to a circuit giving a special reference tone, to a monitor's desk or the like. For such connections special circuits are required all round the frame which require careful attendance and many times constitute a hindrance for other work in the main frame. The removal of jumper wires at telephone take-downs or moves, as well as the running out of new jumper wires, signifies a relatively time consuming labour, partly because the running out and removal of the jumper wire per se is troublesome, partly because the wire ends have to be connected by means of soldering or by means of screw connections. At big main frames the yearly consumption of jumper wire is generally considerable.

It is an object of the invention to obtain a main frame at which the disadvantages of the known devices are to a great extent eliminated. Thus, the main frame of the invention occupies a space that is only a fraction of the space required by the known devices.

The running out or removal of the jumper wire is carried out with great facility, and the connections of the wires to the lines on the exchange side as well as on the outside plant side are carried out in a very simple way as well as the moving of a wire to connect it to an interception board or similar, whereby soldering and screw connections are not required.

This is achieved by the wires of the permanent cabling of the main frame being connected to channel shaped jacks of such a form that a straight contact introduced in the jack is forced to bend in form of an S and that the ends of the jumper wire constitute contacts for jacking into the jacks.

In a preferred embodiment of the invention the jumper wire is to its entire length manufactured of such an elastic material that it may be bent in the S-form of the jack channel without being given a permanent deformation. The wire itself may in this case be used as a plugging-in contact, whereby the only procedure required after cutting the wire is to strip the insulation off a convenient length of the wire end.

Because of the small diameter of the plug contact—equal to the wire diameter—the jack itself will be of very small dimension in cross section. Thus, the jacks may be placed close to each other, whereby a great saving of space is obtained. The jacks for special services as interception service a.s.o. may be placed close to the line jacks, so that any one jumper wire without prolongation may be moved to a jack of any special service provided.

Figure 2:
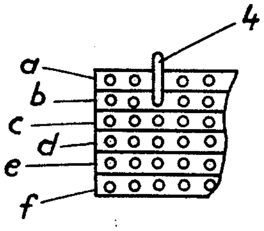
Figure 3:
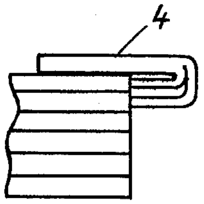
Figure 4:
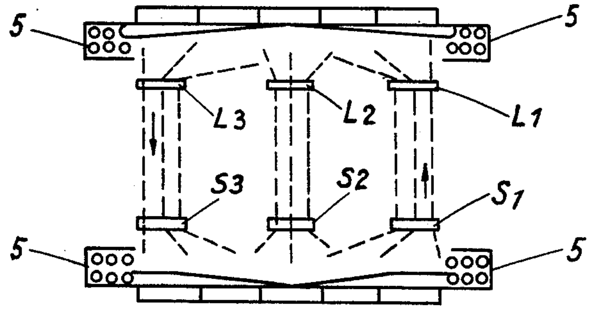

The invention will be further described by means of an example of embodiment with reference to the attached drawing, on which FIG. 1 shows a jack with wires connected, FIG. 2 shows a jack strip seen in front view, and FIG. 3 shows a part of a jack list in side view, and FIG. 4 shows a diagrammatic representation of the jumpering between different shelves of the exchange, respectively outside plant side of the main frame.

The jack 1 shown in FIG. 1 is designed as a channel shaped jack of U-formed cross section that is provided with projections on the inside of the edges, so that a jumper wire introduced in the jack end is bent in S-form, whereby good contact is obtained between the jumper wire and the jack. To the other end of the jack is soldered another wire 3 of the permanent cabling of the main frame. The jacks are mounted in plates of insulating material, the plates being joined to jack strips. The shown embodiment, FIGS. 2 and 3, refers to jack strips with 300 jacks for 50 subscriber's lines, the jacks corresponding to the *a*-wires being located in the plate *a*, those corresponding to the *b*-wires being located in the plate *b*. The plates *c, d, e* and *f* contain jacks for special services, such as interception, monitor's desk, etc. By the short distance between these jacks and the subscriber's line jack jumper wires located in the *a*- and *b*-jacks may simply be moved over to a desired jack pair (*c, d, e, f*). A jumper wire 4 is shown connected to the third line pair of the jack strip.

The main frame is provided with a number of horizontal shelves on the exchange side as well as on the line side, each carrying a sufficient number of jack strips. For a capacity of for instance 10,000 lines 20 shelves are used, whereby on the exchange side each shelf is provided with two rows of 5 jack strips each. The way of running the jumper wires between the exchange side and the line side is shown in FIG. 4. In this figure a shelf level is shown including a shelf of 5 jack strips on each side. Permanently installed cabling of the main frame enters through the cable duct 5 at the end of the shelves and is terminated along the inside of the jack strips. The ways of running the jumper wires are shown with dotted lines. It may be noted that wires coming from an arbitrary shelf on the exchange side and going to a higher located shelf on the line side are carried along one of the short end sides through rings S1 and L1, while those going to a lower located shelf are carried along the other short end side through rings S3 and L3. The arrows indicated in the drawing show the direction in which the wires run from a lower shelf level to a higher. Wires running between shelves in the same level are carried through rings S2 and L2. By the described distribution of the wires between the two short end sides the wires will always cross each other at oblique angles, a fact that gives the advantage of the different wires not being tightly grasped by the surrounding wire bundle as is generally the case, when a great number of wires are crossing each other by arbitrary angles. Wires that are to be removed are easily taken away.

We claim:

1. A jack for interconnection wiring frames in telephone exchanges, said jack comprising a channel-shaped metal strip having on two opposite inner walls several lengthwise staggered protrusions constricting the inner cross-sectional area of the strip at said protrusions, whereby upon insertion of a jumper wire into said strip and past said protrusions the wire is forced into a generally S-shaped configuration and into pressure contact with said protrusions.

2. A jack according to claim 1, wherein said protrusions on opposite strip walls are substantially equidistantly spaced.

3. A jack according to claim 1, wherein said protrusions are formed by indentations in the respective outer walls of the strip.

4. A jack for interconnecting wiring frames in telephone exchanges, said jack comprising a metal strip of generally U-shaped cross section, the inner walls of the branches of said strip being formed with several lengthwise staggered protrusions constricting the inner cross-sectional area of the strip at said protrusions, whereby upon insertion of a jumper wire into said strip and past said protrusions the wire is forced into a generally S-shaped configuration and into pressure contact with said protrusions.

5. An interconnection wiring frame for telephone exchanges, said frame comprising a plurality of jacks, each of said jacks being in the form of a channel-shaped metal strip having on two opposite side walls lengthwise staggered protrusions constricting the inner cross-sectional area of the jack at said protrusions, a lead-in wire secured to one end of each jack, and at least one jumper wire made of elastic wire insulated at its midportion and having stripped ends, whereby upon insertion of the stripped ends into two jacks past the protrusions thereon, said stripped wire ends are forced into a generally S-shaped configuration and into pressure contact with said protrusions.

References Cited in the file of this patent

UNITED STATES PATENTS

| | | |
|---|---|---|
| 862,082 | Lewis | July 30, 1907 |
| 2,644,146 | Dupre | June 30, 1953 |

FOREIGN PATENTS

| | | |
|---|---|---|
| 413,461 | Great Britain | July 19, 1934 |